US012751442B2

(12) United States Patent
Stuber et al.

(10) Patent No.: US 12,751,442 B2
(45) Date of Patent: Oct. 6, 2026

(54) SPRAYER SYSTEM

(71) Applicant: Precision Planting LLC, Tremont, IL (US)

(72) Inventors: Luke Stuber, Tremont, IL (US); Tristan Herrmann, Princeville, IL (US); Jason J. Stoller, Eureka, IL (US); Chad E. Plattner, Tremont, IL (US)

(73) Assignee: Precision Planting LLC, Tremont, IL (US)

( * ) Notice: Subject to any disclaimer, the term of this patent is extended or adjusted under 35 U.S.C. 154(b) by 243 days.

(21) Appl. No.: 18/261,804

(22) PCT Filed: Feb. 11, 2022

(86) PCT No.: PCT/IB2022/051220
§ 371 (c)(1),
(2) Date: Jul. 17, 2023

(87) PCT Pub. No.: WO2022/180477
PCT Pub. Date: Sep. 1, 2022

(65) Prior Publication Data

US 2024/0081315 A1 Mar. 14, 2024

Related U.S. Application Data

(60) Provisional application No. 63/153,621, filed on Feb. 25, 2021.

(51) Int. Cl.
*A01M 7/00* (2006.01)
*B05B 12/06* (2006.01)

(52) U.S. Cl.
CPC ........ *A01M 7/0092* (2013.01); *A01M 7/0042* (2013.01); *B05B 12/06* (2013.01)

(58) Field of Classification Search
CPC .... A01M 7/0092; A01M 7/0042; B05B 12/06
USPC ........................................................... 239/10
See application file for complete search history.

(56) References Cited

U.S. PATENT DOCUMENTS

| | | | | | |
|---|---|---|---|---|---|
| 5,294,089 | A * | 3/1994 | LaMarca | F16K 31/42 251/39 |
| 6,062,496 | A * | 5/2000 | Kinter | A01M 7/0089 239/575 |
| 6,089,532 | A * | 7/2000 | Rohloff | F16K 7/17 251/61.4 |
| 6,250,564 | B1 * | 6/2001 | Chahley | B05B 15/658 239/586 |

(Continued)

FOREIGN PATENT DOCUMENTS

WO WO2001095714 * 12/2001 .............. A01M 7/00

*Primary Examiner* — Chee-Chong Lee

(57) ABSTRACT

A sprayer system comprising: a first liquid line; a second liquid line; a liquid storage tank, which is in fluid communication with the first liquid line; an apparatus, which is in fluid communication with the second liquid line; at least one auxiliary tank in fluid communication with the apparatus; wherein the liquid storage tank is in fluid communication with the apparatus; and wherein the first liquid line and the second liquid line are in fluid communication with at least one row. The sprayer system can be used to apply one chemical to an entire field and selectively apply an additional chemical to individual locations in the field.

10 Claims, 5 Drawing Sheets

(56) References Cited

U.S. PATENT DOCUMENTS

| | | | | |
|---|---|---|---|---|
| 6,314,979 | B1 * | 11/2001 | Lips | A01G 25/16<br>137/624.2 |
| 6,522,948 | B1 * | 2/2003 | Benneweis | A01C 23/047<br>701/50 |
| 6,619,612 | B2 * | 9/2003 | Freisinger | F16K 31/404<br>251/30.03 |
| 10,799,897 | B2 * | 10/2020 | Posselius | B05B 12/1418 |

* cited by examiner

SPRAYER SYSTEM

CROSS-REFERENCE TO RELATED APPLICATIONS

This application is a national phase entry under 35 U.S.C. § 371 of International Patent Application PCT/IB2022/051220, filed Feb. 11, 2022, designating the United States of America and published in English as International Patent Publication WO 2022/180477 A1 on Sep. 1, 2022, which claims priority to U.S. Provisional Application No. 63/153,621, filed on 25 Feb. 2021, which is incorporated herein by reference in its entirety.

BACKGROUND

When applying chemicals to a field, such as fertilizer, herbicide, insecticide, or pesticide, there can be some chemicals that are to be applied to the entire field, such as fertilizer. There are some chemicals, such as an herbicide, insecticide, or pesticide, that needs to be applied but not to the entire field. Selective application minimizes waste and saves money. It would be beneficial to have a spraying system that could apply a chemical to the field and selectively apply a second chemical to selected spots in the field.

DETAILED DESCRIPTION

All references cited herein are incorporated herein in their entireties. If there is a conflict between a definition herein and in an incorporated reference, the definition herein shall control.

Figure 1:
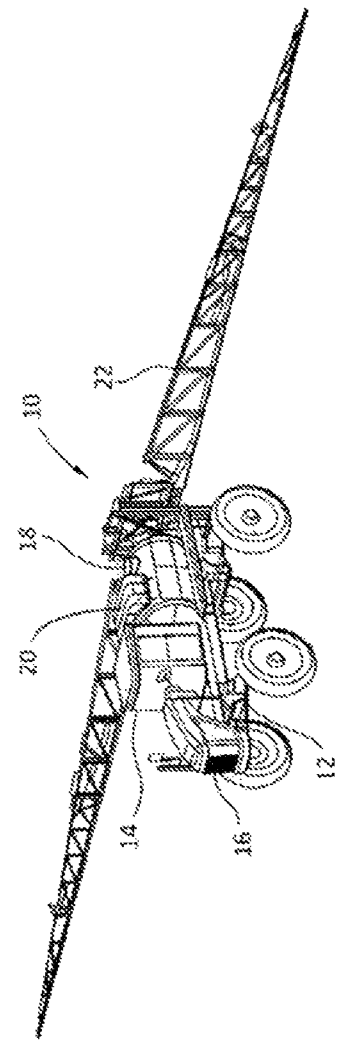
FIG. 1 is an illustration of an agricultural crop sprayer.

Referring to the drawings, wherein like reference numerals designate identical or corresponding parts throughout the several views, FIG. 1 illustrates an agricultural implement.

Referring to the drawings, wherein like reference numerals designate identical or corresponding parts throughout the several views, FIG. 1 illustrates an agricultural implement, such as a sprayer 10. While the system can be used on a sprayer, the system can be used on any agricultural implement that is used to apply fluid to soil, such as a side-dress bar, a planter, a seeder, an irrigator, a tillage implement, a tractor, a cart, or a robot.

FIG. 1 shows an agricultural crop sprayer 10 used to deliver chemicals to agricultural crops in a field. Agricultural sprayer 10 comprises a chassis 12 and a cab 14 mounted on the chassis 12. Cab 14 may house an operator and a number of controls for the agricultural sprayer 10. An engine 16 may be mounted on a forward portion of chassis 12 in front of cab 14 or may be mounted on a rearward portion of the chassis 12 behind the cab 14. The engine 16 may comprise, for example, a diesel engine or a gasoline powered internal combustion engine. The engine 16 provides energy to propel the agricultural sprayer 10 and also can be used to provide energy used to spray fluids from the sprayer 10.

Although a self-propelled application machine is shown and described hereinafter, it should be understood that the embodied invention is applicable to other agricultural sprayers including pull-type or towed sprayers and mounted sprayers, e.g. mounted on a 3-point linkage of an agricultural tractor.

The sprayer 10 further comprises a main liquid storage tank 18 used to store a spray liquid to be sprayed on the field. The spray liquid can include chemicals, such as but not limited to, herbicides, pesticides, and/or fertilizers. Main liquid storage tank 18 is to be mounted on chassis 12, either in front of or behind cab 14. The stored chemicals may be dispersed by the sprayer 10 one at a time or different chemicals may be mixed and dispersed together in a variety of mixtures. The sprayer 10 further comprises a rinse water tank 20 used to store clean water, which can be used for storing a volume of clean water for use to rinse the plumbing and main tank 18 after a spraying operation.

At least one boom arm 22 on the sprayer 10 is used to distribute the fluid from the main liquid tank 18 over a wide swath as the sprayer 10 is driven through the field. The boom arm 22 is provided as part of a spray applicator system, which further comprises an array of spray nozzles (described later) arranged along the length of the boom arm 22 and suitable sprayer plumping used to connect the main liquid storage tank 18 with the spray nozzles. The sprayer plumping will be understood to comprise any suitable tubing or piping arranged for fluid communication on the sprayer 10.

Figure 2:
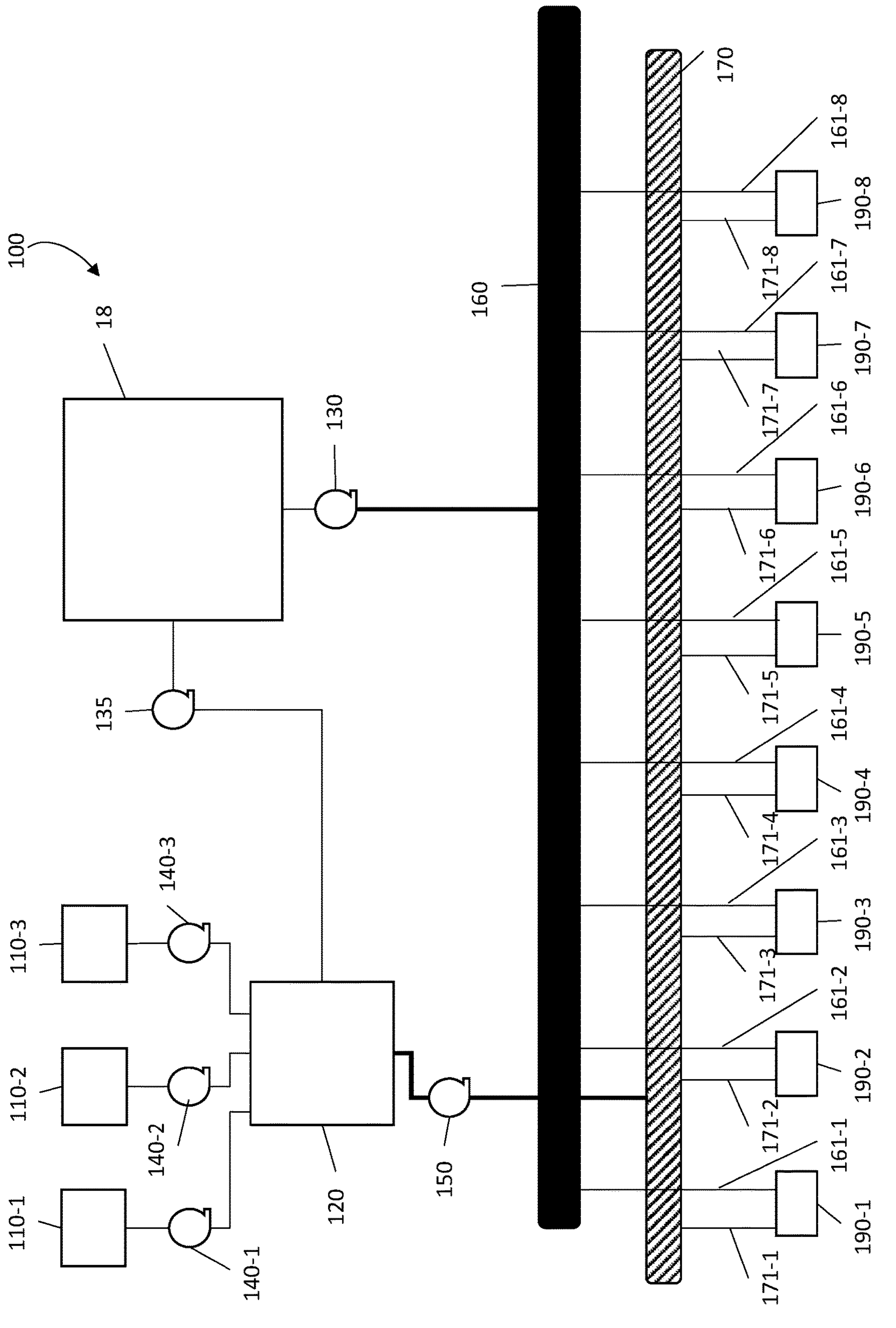
FIG. 2 is a schematic illustration of a sprayer system with multiple delivery lines.
Figure 3:
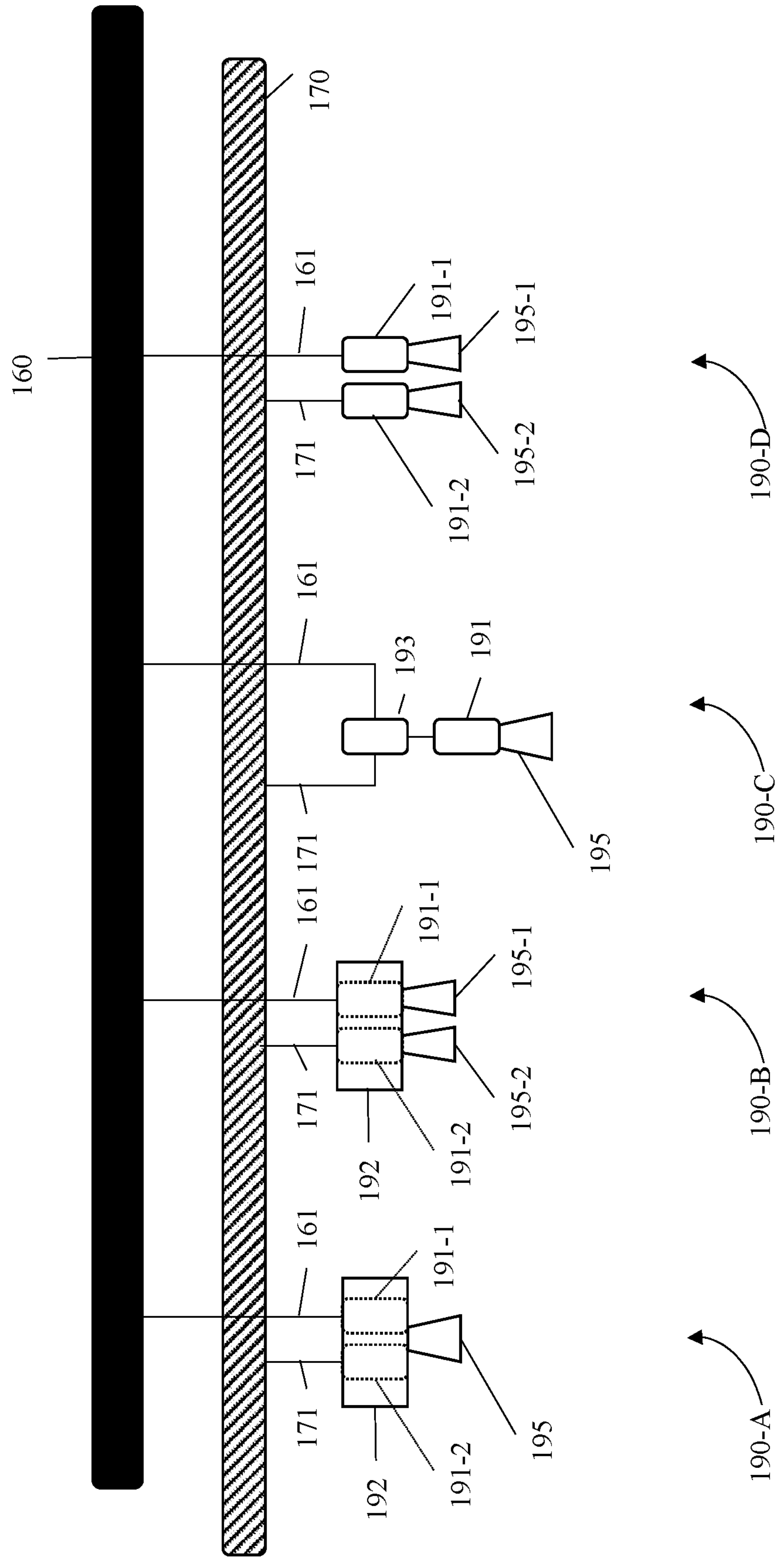
FIG. 3 illustrates different valving arrangements for delivering fluids to a row from multiple delivery lines.

FIGS. 2 and 3 illustrate a liquid application system 100. Liquid application system 100 has the main liquid tank 18. This can contain a carrier liquid, such as water, and optionally, it can contain a chemical (such as a fertilizer, a pesticide, a herbicide, an insecticide, etc.) that is applied to an entire field. The liquid application system 100 contains at least one auxiliary liquid tank 110. As illustrated in FIG. 2, there are three auxiliary liquid tanks 110 (110-1, 110-2, and 110-3). There can be any number of auxiliary liquid tanks depending on the number of additional chemicals that may want to be applied.

Main liquid tank 18 is connected to a first liquid line 160 via pump and line 130, and main liquid tank 118 is connected to apparatus 120 via pump and line 135. Apparatus 120 can be a mix tank, or apparatus 120 can be a manifold for combining the inputs. Apparatus 120 is connected to a second liquid line 170 via pump and line 150. The liquid in main tank 18 is applied to the entire field by either through first liquid line 160 or second liquid line 170.

Auxiliary tank 110 (110-1, 110-2, and 100-3) is connected to mix tank via pump and line 140 (140-1, 140-2, and 140-3). One or more additional chemicals can be added to apparatus 120. The mixture in apparatus 120 can be selectively applied to the field. Examples include, but are not limited to, applying a specific chemical to a specific location in the field.

Any pump and line (130, 135, 140, 150) individually can be replaced with just a line if the tank (18, 11, 120) supplying the pump is pressurized to provide the motive force.

In FIG. 2, liquid application system is illustrated with 8 rows 190 (190-1 to 190-8), but any number of rows 190 can be used. For simplification, row 190 is schematically represented, and options for each row 190 are described below. Each row 190 (190-1 to 190-8) are connected to the first liquid line 160 via line 160 (161-1 to 161-8) and the second liquid line 170 via line 171 (171-1 to 171-8).

FIG. 3 illustrates four options for row 190 (190-A, 190-B, 190-C, and 190-D). Each row 190 has a pulse width modulation (PMW) valve 191 and nozzle 195. In row 190-A, there is a first PWM valve 191-1 connected to the first liquid line 160, and a second PWM valve 191-2 connected to the second liquid line 170. Both are stored in a housing 192. Both the first PWM valve 191-1 and second PWM valve 191-2 output to nozzle 195. Row 190-B is similar to row 190-A except that first PWM valve outputs through nozzle 195-1, and second PWM valve 191-2 outputs through nozzle 195-2. Row 190-D is similar to row 190-B except that there is no housing 192. Row 190-C has a three way valve 193 connected to first liquid line 160 and second liquid line 170 and outputs to PWM valve 191, which outputs through nozzle 195.

Referring back to FIG. 2, each row 190 (190-1 to 190-8) is independently controlled. For example, if a treatment from apparatus 120 needs to be applied in row 5, row 190-5 can switch supply from first liquid line 160 to second liquid line 170 to apply the mixture from apparatus 120 to a point or area on the field, and then switch back to first liquid line 160 when the mixture is no longer needed to be applied.

PWM valves 191 and three way valve 193 can be controlled with a controller, such as controller 200 described in International Publication No. WO2020/178663, which can be connected to a monitor 1000, such as is described in U.S. Pat. No. 8,078,367.

Figure 4:
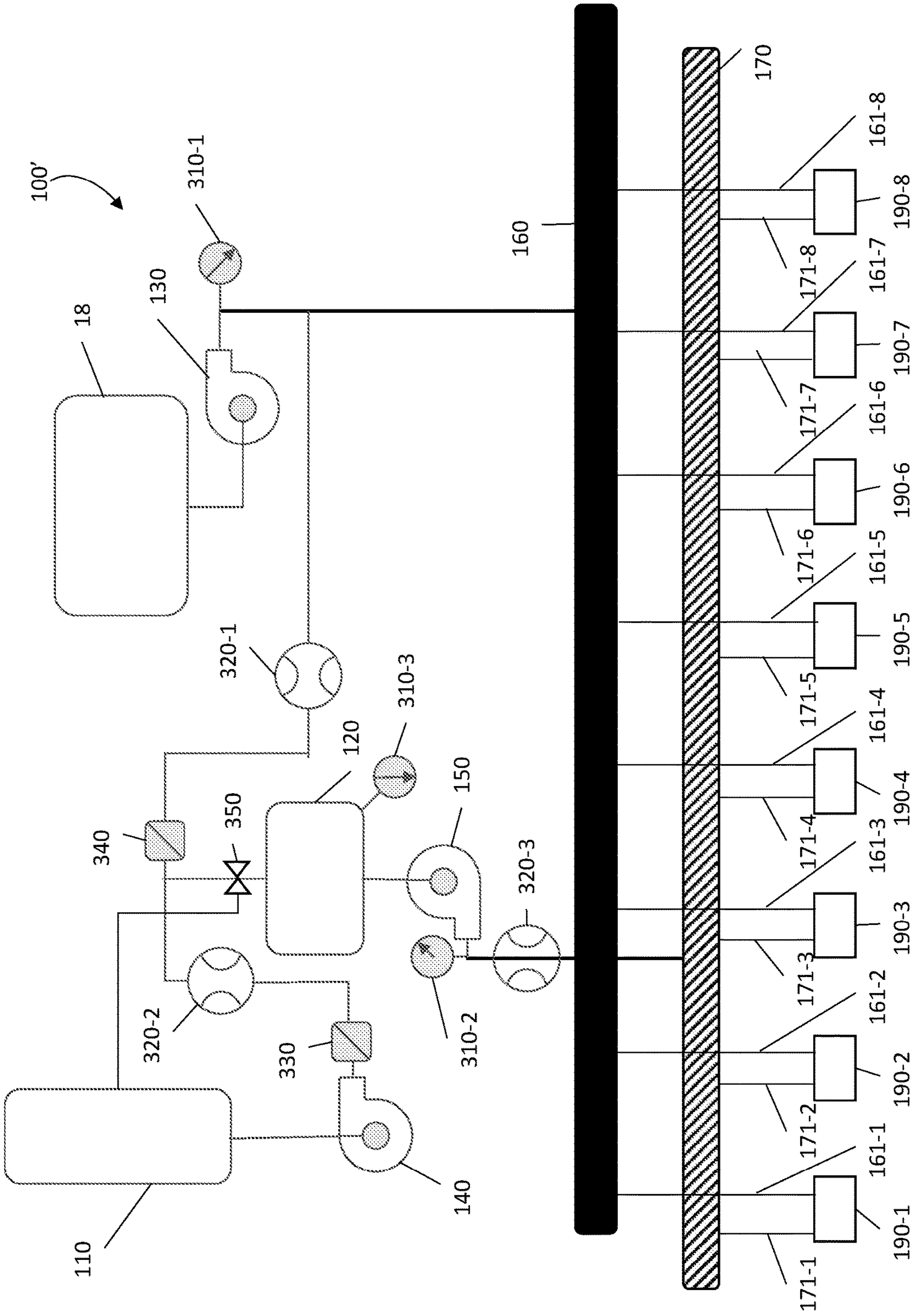
FIG. 4 is a schematic illustration of a sprayer system with multiple delivery lines.
Figure 5:
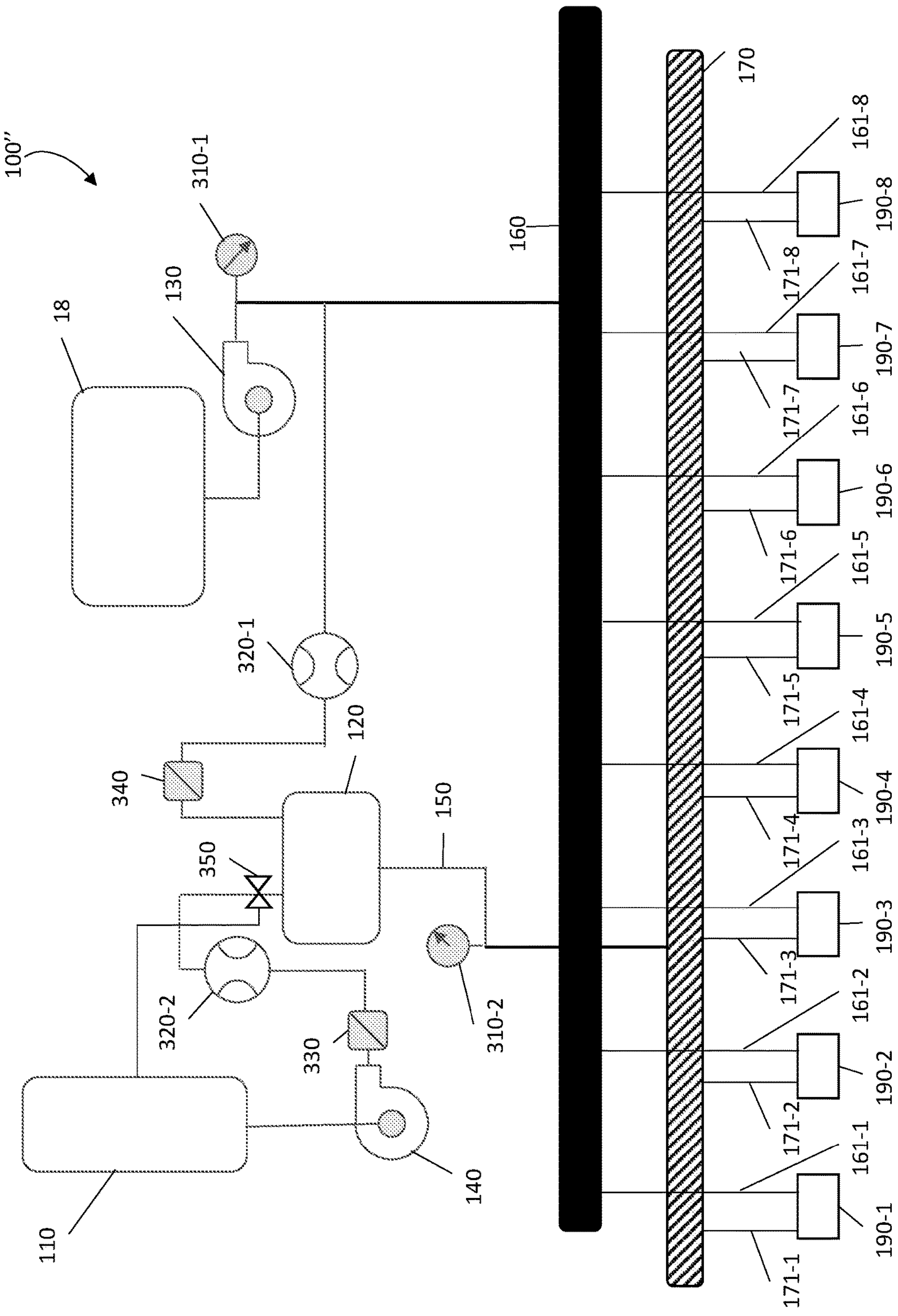
FIG. 5 is a schematic illustration of a sprayer system with multiple delivery lines.

FIG. 4 illustrates liquid application system 100', and FIG. 5 illustrates liquid application system 100". For simplification, there is one auxiliary liquid tank 110 illustrated in these figures, but there can be multiple auxiliary liquid tanks 110 as described above. Optional pressure sensors 310 (310-1, 310-2, 310-3) can be installed in liquid application system 100', 100" (or liquid application system 100). Pressure sensor 310-1 can be located to measure the pressure from pump and line 130. Pressure sensor 310-2 can be located to measure pressure from pump and line 150. Pressure sensor 310-3 can be connected to apparatus 120 to measure the pressure in apparatus 120.

Optional flow meters 320 (320-1, 320-2, 320-3) can be installed in liquid application system 100', 100" (or liquid application system 100). Flow meter 320-1 can be located to measure flow rate into apparatus 120 from liquid storage tank 18. Flow meter 320-2 can be located to measure flow from an auxiliary liquid tank 110. There can be separate flow meters 320-2 for each flow from an auxiliary liquid tank 110. Flow meter 320-3 can be located to measure flow from pump 150. Examples of flow meters 320 include, but are not limited to, electromagnetic flow meters, such as EM FlowSense™ from Precision Planting LLC.

Optional valves 330 can regulate the flow from each auxiliary liquid tank 110. Examples of valves 330 include, but are not limited to, ball valves, such as EMHD control valves from Precision Planting LLC, or pulse width modulation valves. Optional valves 340 can regulate flow from liquid storage tank 18 to apparatus 120. These can be the same as valves 330, or valves 340 can be a check valve.

System 100' in FIG. 4 operates by pumping liquid from apparatus 120 through line and pump 150. System 100" in FIG. 5 operates by using pressure supplied to apparatus 120 from pump 130 and/or pump 140. Since there is pressure, line and pump 150 is replaced with line 150.

Flow meters 320 are in communication with controller 200 to provide measured flow rate. Controller 200 can then control the flow rate by sending signals to valves 330 and/or 340 to regulate the flow.

Optional valves 350 can be located prior to apparatus 120 to return fluid to auxiliary liquid tanks 110. This is illustrated in FIGS. 4 and 5. While FIGS. 4 and 5 are illustrated with one auxiliary liquid tank 110, there can be individual valves 350 returning to auxiliary liquid tanks 110. Optional valve 350 allows flow through flow meter 320-2 without going to apparatus 320 to allow flow meter 320-2 to be calibrated. Fluid flow through flow meter 320-2 but returns to auxiliary liquid tank 110. Also, pump and lines 140 can be emptied back to auxiliary liquid tank 110 at the end of spraying operations.

EXAMPLES

The following are nonlimiting examples.

Example 1—a sprayer system comprising: a first liquid line; a second liquid line; a liquid storage tank, which is in fluid communication with the first liquid line; an apparatus, which is in fluid communication with the second liquid line; at least one auxiliary tank in fluid communication with the apparatus; wherein the liquid storage tank is in fluid communication with the apparatus; and wherein the first liquid line and the second liquid line are in fluid communication with at least one row.

Example 2—the sprayer system of Example 1, wherein the row comprises a first pulse width modulated valve in fluid communication with the first liquid line and a second pulse width modulated valve in fluid communication with the second liquid line.

Example 3—the sprayer system of Example 2, wherein the first pulse width modulated valve is connected to a first nozzle and the second pulse width modulated valve is connected to a second nozzle.

Example 4—the sprayer system of Example 2, wherein the first pulse width modulated valve and the second pulse width modulated valve are connected to a nozzle.

Example 5—the sprayer system of Example 3 or 4 further comprising a housing and the first pulse width modulated valve and the second pulse width modulated valve are disposed in the housing.

Example 6—the sprayer system of Example 1, wherein the row comprises a three way valve in fluid communication with the first liquid line and the second liquid line, and the three way valve is in fluid communication with a pulse width modulated valve, which is in fluid communication with a nozzle.

Example 7—the sprayer system of any preceding Example, wherein each row is selectively in fluid communication with the first fluid line or the second fluid line.

Example 8—the sprayer system of any preceding Example, wherein the at least one auxiliary tank comprises two or three auxiliary tanks.

Example 9—the sprayer system of any preceding Example, wherein the apparatus is a mixing tank.

Example 10—the sprayer system of any of Examples 1 to 8, wherein the apparatus is a manifold.

Example 11—A sprayer system comprising: a first liquid line; a second liquid line; wherein the first liquid line and the second liquid line are in fluid communication with at least one row; and wherein the row comprises one of: i) a first pulse width modulated valve in fluid communication with the first liquid line and a second pulse width modulated valve in fluid communication with the second liquid line, or ii) a three way valve in fluid communication with the first liquid line and the second liquid line, and the three way valve is in fluid communication with a pulse width modulated valve, which is in fluid communication with a nozzle.

Example 12—the sprayer system of Example 11, wherein the row comprises i) the first pulse width modulated valve in fluid communication with the first liquid line and the second pulse width modulated valve in fluid communication with the second liquid line.

Example 13—the sprayer system of Example 12, wherein the first pulse width modulated valve is connected to a first nozzle and the second pulse width modulated valve is connected to a second nozzle.

Example 14—the sprayer system of Example 12, wherein the first pulse width modulated valve and the second pulse width modulated valve are connected to a nozzle.

Example 15—the sprayer system of Example 13 or 14 further comprising a housing and the first pulse width modulated valve and the second pulse width modulated valve are disposed in the housing.

Example 16—the sprayer system of Example 11, wherein the row comprises the ii) the three way valve in fluid communication with the first liquid line and the second liquid line, and the three way valve is in fluid communication with the pulse width modulated valve, which is in fluid communication with the nozzle.

Example 17—the sprayer system of any of Examples 11 to 16, wherein each row is selectively in fluid communication with the first fluid line or the second fluid line.

Example 18—the sprayer system of any preceding Example further comprising a flow meter to measure a flow rate between the auxiliary tank and the apparatus.

Example 19—the sprayer system of Example 18 further comprising a valve to control a flow between the auxiliary tank and the apparatus.

Example 20—the sprayer system of Example 19, wherein the valve is a pulse width modulation valve.

Example 21—the sprayer system of any preceding Example further comprising a flow meter to measure a flow rate between the liquid storage tank and the apparatus.

Example 22—the sprayer system of Example 21 further comprising a valve to control a flow between the liquid storage tank and the apparatus.

Example 23—the sprayer system of any preceding Example further comprising a valve before the apparatus for providing fluid communication back to the at least one auxiliary tank.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A sprayer system comprising:

a first liquid line;

a second liquid line;

a liquid storage tank, which is in fluid communication with the first liquid line;

an apparatus, which is in fluid communication with the second liquid line;

at least one auxiliary tank in fluid communication with the apparatus;

wherein the liquid storage tank is in fluid communication with the apparatus; and wherein the first liquid line is connected to at least one row and the second liquid line is connected to the at least one row separately from the first liquid line, the at least one row including at least one valve and at least one nozzle, wherein the liquid storage tank is in fluid communication with the first liquid line such that liquid from the liquid storage tank is communicated to the first liquid line and to the at least one row through the first liquid line without passing through the apparatus, wherein liquid from the liquid storage tank is communicated to the second liquid line through the apparatus and to the at least one row through the second liquid line without passing through the first liquid line.

2. The sprayer system of claim 1, wherein the at least one row comprises a first pulse width modulated valve in fluid communication with the first liquid line and a second pulse width modulated valve in fluid communication with the second liquid line.

3. The sprayer system of claim 2, wherein the first pulse width modulated valve is connected to a first nozzle of the at least one nozzle and the second pulse width modulated valve is connected to a second nozzle of the at least one nozzle.

4. The sprayer system of claim 3 further comprising a housing and the first pulse width modulated valve and the second pulse width modulated valve are disposed in the housing.

5. The sprayer system of claim 2, wherein the first pulse width modulated valve and the second pulse width modulated valve are connected to a nozzle.

6. The sprayer system of claim 1, wherein the at least one row comprises a three way valve in fluid communication with the first liquid line and the second liquid line, and the three way valve is in fluid communication with a pulse width modulated valve, which is in fluid communication with a nozzle.

7. The sprayer system of claim 1, wherein the at least one row is selectively in fluid communication with the first fluid line or the second fluid line.

8. The sprayer system of claim 1, wherein the at least one auxiliary tank comprises two or three auxiliary tanks.

9. The sprayer system of claim 1, wherein the apparatus is a mixing tank.

10. The sprayer system of claim 1, wherein the apparatus is a manifold.

* * * * *